Figure 1:
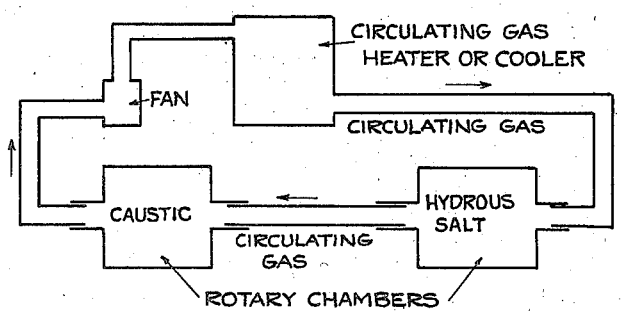

Oct. 27, 1936.  A. K. HOBBY ET AL  2,058,980
PROCESS FOR HYDRATING CAUSTICS AND DEHYDRATING HYDROUS SALTS

Filed Jan. 31, 1931

Patented Oct. 27, 1936

2,058,980

UNITED STATES PATENT OFFICE 2,058,980

PROCESS FOR HYDRATING CAUSTICS AND DEHYDRATING HYDROUS SALTS

Amos K. Hobby, Cambridge, and Parker C. Choate, Essex, Mass.

Application January 31, 1931, Serial No. 512,737

5 Claims. (Cl. 23—188)

This invention relates to a new and useful process for hydrating caustics and dehydrating hydrous salts, enabling superior and novel products to be made, and herein we do describe our invention.

For purposes of definition herein we define caustics as oxides of alkali and alkaline earth metals.

Caustics, for example CaO, MgO, develop much more heat in forming their hydrates, being stable usually under 400° C., while hydrous salts like $CaSO_4, 2H_2O$—$Al_2(SO_4)_3, 16H_2O$, —$CuSO_4, 5H_2O$, etc., carry much less heat of hydration, decomposing from atmosphere up to about 300° C.

Because of the above technical facts, caustics will react with hydrous salts, with a more or less exothermic generation of heat forming caustic hydrates and dehydrated salts, where proper conditions for reaction exist.

Caustic lime is now hydrated by adding water to form the hydrate of commerce, with the generation of much heat, often adequate to kindle wood, and with an irregular quality of hydrate formed.

Gypsum rock and other salts are heated to decompose the hydrous salt, liberating water as a vapor, consuming fuel, and giving irregular results, because of uneven temperature in mass heating.

Lime hydrate and calcined gypsum are extensively used as plaster in trade, also dehydrated salts.

Our purpose is to create a better grade of hydrate, also calcined salt, better regulate the hydration of the varying qualities of lime stone used, and all at lower costs of operation.

We have discovered that the circulation of an atmosphere like air carrying water vapor, maintained at a desired temperature to enable the reaction desired, such circulating atmosphere contacting with masses of caustic and hydrous salt alternately, will cause a better grade of product to result, and if the exothermic heat of reaction is conserved in the circulating apparatus, such heat will be usually adequate to carry on the reacting process.

If the reacting heat balance for any reason does not supply adequate heat to offset radiation losses of apparatus, plus specific heat of product discharged, the atmosphere in circulation may be heated extraneously.

We will illustrate by several reactions:

$1\frac{1}{2}CaO + CaSO_4, 2H_2O =$
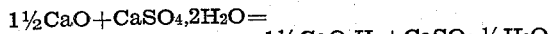
$1\frac{1}{2}CaO_2H_2 + CaSO_4, \frac{1}{2}H_2O$ This reaction forms calcium hydrate and plaster of Paris and is conducted with atmospheric temperatures of circulation up to about 150° C.

$2CaO (or MgO) + CaSO_4, 2H_2O = 2CaO_2H_2 + CaSO_4$

This reaction forms so-called soluble anhydrite and is conducted at temperatures above 150° C., usually 250° C., but if temperature is allowed to reach much exceeding 250° C., an insoluble form of anhydrite may form, being inactive in setting reaction. The time and temperature of this treatment may be utilized to regulate the time of set in commercial plaster.

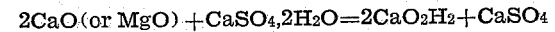
$16CaO + Al_2(SO_4)_3, 16H_2O = 16CaO_2H_2 + Al_2(SO_4)_3$

This reaction requires above 316° C. for full reaction, produces large proportions of hydrate, using the aluminum salt at will as medium in continuous rotation, being extraneously hydrated alternately.

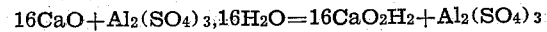
$5CaO + CuSO_4, 5H_2O = 5CaO_2H_2 + CuSO_4$

This reaction conducted about 160° C. produces a fine market grade of anhydrous copper sulphate.

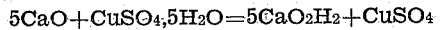
$6CaO + FeSO_4, 7H_2O = 6CaO_2H_2 + FeSO_4, H_2O$

This partial dehydration of copperas takes place at above 80° C., producing at a very low temperature a commercially dry salt and a caustic hydrate in one act at low cost. This formula may be useful at iron pickling works.

Any of the alkali or alkaline earths may be used, all producing stable quality hydrates reacting with the water vapor absorbed by a current of carrying gas, as air, while the hydrous salt may largely vary, being used in rotation alternately re-hydrated, as with aluminum sulphate, or producing a commercial dehydrated salt, as with gypsum or copper sulphate.

Reacting proportions of caustic and hydrous salt are regulated in charges (impurities discounted) in proportion to the degrees of water exchange desired, enough caustic being present to absorb the water vapor liberated by the hydrous salt at the temperature of the circulating gas carrier.

The invention consists in the use of a carrier gas to transfer water vapor and the products resulting.

The caustic hydrates and anhydrous salts are always solids, thus are discharged as solid products, but the hydrous salts may be semi-fluid or pasty in certain stages of hydration.

In practice, we prefer to crush the caustic to sizes as large as 1 to 2 inch cross section with fines ad libitum, while a product like gypsum rock is more dense and is preferably crushed to ½ inch cross section with fines.

The reaction tends to disintegrate the masses to a molecular fineness, with lumps of foreign matter remaining undisintegrated.

Products so produced, possess evenness of texture and quality not obtained by other means.

Hydration and dehydration are thus performed in one act, usually with an excess of heat generated.

While apparatus is not part of our process, we will describe suitable means, assuming that others will find analogous means of utilizing the conditions we prescribe.

If batch treatments are desired, closed furnace hearths previously heated may be charged with masses of caustic and hydrous salt, and air at reacting temperature allowed or forced to circulate, extraneous heat or cooling action being applied in any way to air in circulation to create or maintain desired temperatures.

In the drawing or sketch, Figure 1, the rotary chambers represent drums, turned on hollow axles, in stationary circulating gas mains, such drums carrying separated masses of caustic and hydrous salt, under treatment.

Means to feed and discharge the contents are obvious, as usual in batch apparatus.

A fan is designated as connected in the circulating gas carrier mains, also a heating or cooling device.

Figure 2:
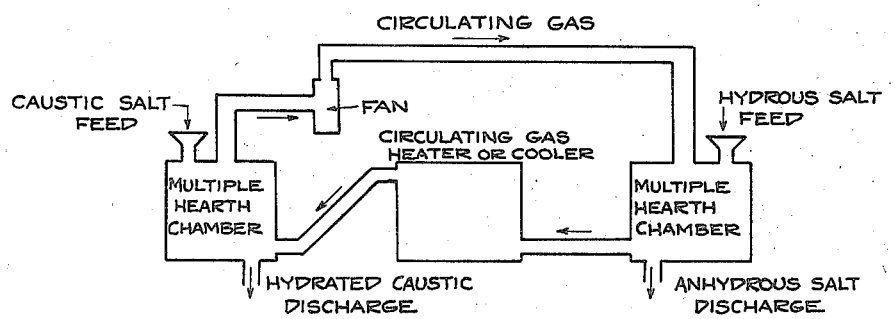

In sketch Figure 2, the hearth chambers show the separated caustic and hydrous salt containers, continuously fed and discharged, each container having moving ploughs to enable travel from feed to discharge, over the hearths. Such devices may be of numerous designs.

The circulating gas mains, connected with the hearth chambers, (all fixed apparatus) show a fan in the circuit, also heater and cooler, to enable proper flow of carrier gas, enabling its temperature control.

In both designs no attempt has been made to show operative relations, nor confine action of flow of carrier air current in any specific way, while the temperature control may be varied as to means outside of action within the reacting furnace to effect the product. No attempt is here shown to control the dust action of mechanical nature, but such is practical with electrostatic precipitation or screen devices during the air cycle.

The initiation of action must come from temperature, supplied to the carrier gas, and such temperature may be supplied by a variety of means.

The gas may be warmed to a temperature at which the hydrous salt will decompose to humidify the carrier gas, and humid gas current used at the start, the H₂O of which will react with the caustic at any temperature used.

Any obvious means may be used to initiate temperature in the carrier gas to enable reaction.

A hollow core or shaft in the centre acts as a passage through which the circulating air carrier passes, to be delivered in rotation to the hearth areas in varying forms of series and multiple distribution.

The circulating gas carrier may be heated or cooled in this centre chamber by contact with flues, as desired.

Such an apparatus will have capacity as designed, may consist of 4 or 8 superincumbent hearths, the top half treating hydrous salt, the bottom half treating caustic, each with separate feed and discharge, or vice versa; or two separate furnaces may be connected by a flue through which a temperature regulated air vapor carrier circuit exists.

Feed and discharge is trapped to prevent loss of circulating air, and furnace constructed to save heat.

Such furnace types are very usual in the treatment of ores, and require no more than general mention.

It is inadvisable to allow thick layers of mass under treatment, as packing action defeats free gas carrier circulation contact, necessary to enable molecular reaction.

The caustic hydrate has improved evenness and plastic quality, due to the manner of transferring the water of hydration, while the dehydration of the salt is much better under control, due to the regulated rate and temperature or the carrier gas current.

Having described our invention, we desire patent issue, under the following claims:

1. The process of exchanging water of combination between caustic and hydrous salts, which consists in cyclicly circulating a warmed carrier gas over separated masses of such products, whereby water vapor is alternately absorbed by the caustic and discharged by the hydrous salts.

2. The process of claim 1 in which batch masses are tumbled, as in a rotator, during the cyclic contacting of the carrier gas.

3. The process of claim 1 in which continuously fed and discharged, separated masses, are tumbled by ploughs upon hearths, during the cyclic contacting of the carrier gas.

4. In the process of efficiently transferring H₂O as carried vapor, from a decomposing hydrous salt to a hydrating caustic, each in separate containers, the step of tumbling separately with aeration each mass, during a cyclic contacting flow of a carrier gas current.

5. In the process of claim 1, the step of regulating the temperatures of the circulating carrier gas, which consists in heating or cooling such circulating gas, externally of the reacting masses.

AMOS K. HOBBY.
PARKER C. CHOATE.